US012802844B2

(12) United States Patent
Ichihara et al.

(10) Patent No.: US 12,802,844 B2
(45) **Date of Patent: *Nov. 17, 2026**

(54) GRAIN-ORIENTED ELECTRICAL STEEL SHEET

(71) Applicant: JFE STEEL CORPORATION, Tokyo (JP)

(72) Inventors: Yoshihisa Ichihara, Tokyo (JP); Takeshi Omura, Tokyo (JP); Kunihiro Senda, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 393 days.

This patent is subject to a terminal disclaimer.

(21) Appl. No.: 18/562,217

(22) PCT Filed: Apr. 27, 2022

(86) PCT No.: PCT/JP2022/019153
§ 371 (c)(1),
(2) Date: Nov. 17, 2023

(87) PCT Pub. No.: WO2022/255013
PCT Pub. Date: Dec. 8, 2022

(65) Prior Publication Data

US 2024/0233991 A1 Jul. 11, 2024

(30) Foreign Application Priority Data

May 31, 2021 (JP) ................................ 2021-091829

(51) Int. Cl.
*H01F 1/147* (2006.01)
*C21D 8/1244* (2026.01)
(Continued)

(52) U.S. Cl.
CPC ....... *H01F 1/14775* (2013.01); *C21D 8/1244* (2013.01); *C21D 8/1272* (2013.01);
(Continued)

(58) Field of Classification Search
CPC ........................................................ C21D 9/46
See application file for complete search history.

(56) References Cited

U.S. PATENT DOCUMENTS

2009/0272464 A1* 11/2009 Hamamura .............. C21D 8/12 148/400
2014/0338792 A1 11/2014 Takajo et al.
(Continued)

FOREIGN PATENT DOCUMENTS

CN 101528951 A 9/2009
CN 104011246 A 8/2014
(Continued)

OTHER PUBLICATIONS

Oct. 28, 2025, Office Action issued by the China National Intellectual Property Administration in the corresponding Chinese Patent Application No. 202280038086.X with English language search report.

(Continued)

*Primary Examiner* — Jophy S. Koshy
(74) *Attorney, Agent, or Firm* — KENJA IP LAW PC

(57) ABSTRACT

Provided is a grain-oriented electrical steel sheet that achieves both low iron loss and low magnetostriction and has excellent transformer properties. The grain-oriented electrical steel sheet has a thermal strain-imparted region extending linearly in a direction crossing the rolling direction, and in the strain distribution in the rolling direction of the thermal strain-imparted region, the strain at both ends of
(Continued)

the thermal strain-imparted region is tensile strain larger than the strain at the center of the thermal strain-imparted region.

2 Claims, 3 Drawing Sheets

(51) Int. Cl.

| | |
|---|---|
| ***C21D 8/1277*** | (2026.01) |
| ***C21D 8/1294*** | (2026.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/08*** | (2006.01) |
| ***C22C 38/60*** | (2006.01) |
| ***H01F 1/16*** | (2006.01) |

(52) U.S. Cl.

CPC ......... *C21D 8/1283* (2013.01); *C21D 8/1288* (2013.01); *C21D 8/1294* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C22C 38/08* (2013.01); *C22C 38/60* (2013.01); *H01F 1/147* (2013.01); *H01F 1/16* (2013.01); *C21D 2201/05* (2013.01); *C22C 2202/02* (2013.01)

(56) References Cited

U.S. PATENT DOCUMENTS

| | | | | |
|---|---|---|---|---|
| 2014/0352849 | A1 | 12/2014 | Suehiro et al. | |
| 2016/0133368 | A1 | 5/2016 | Okabe et al. | |
| 2018/0037965 | A1 | 2/2018 | Takajo et al. | |
| 2024/0233991 | A1 | 7/2024 | Ichihara et al. | |
| 2024/0242864 | A1* | 7/2024 | Ichihara .................. | C21D 9/46 |

FOREIGN PATENT DOCUMENTS

| | | | |
|---|---|---|---|
| CN | 105339510 | A | 2/2016 |
| CN | 107250391 | A | 10/2017 |
| EP | 2083091 | A1 | 7/2009 |
| EP | 2799580 | A1 | 11/2014 |
| EP | 3985134 | A1 | 4/2022 |
| JP | H0622179 | B2 | 3/1994 |
| JP | H07192891 | A | 7/1995 |
| JP | 2005248291 | A | 9/2005 |
| JP | 2008106288 | A | 5/2008 |
| JP | 2020105589 | A | 7/2020 |
| KR | 1020120073913 | A | 7/2012 |
| WO | 2020255552 | A1 | 12/2020 |

OTHER PUBLICATIONS

Sep. 30, 2025, Office Action issued by the Korean Intellectual Property Office in the corresponding Korean Patent Application No. 10-2023-7037762 with English language concise statement of relevance.

Oct. 17, 2023, Notification of Reasons for Refusal issued by the Japan Patent Office in the corresponding Japanese Patent Application No. 2022-552690 with English language concise statement of relevance.

Jul. 19, 2022, International Search Report issued in the International Patent Application No. PCT/JP2022/019153.

Sep. 6, 2024, the Extended European Search Report issued by the European Patent Office in the corresponding European Patent Application No. 22815768.1.

* cited by examiner

GRAIN-ORIENTED ELECTRICAL STEEL SHEET

TECHNICAL FIELD

This disclosure relates to a grain-oriented electrical steel sheet suitable as an iron core material for transformers and the like.

BACKGROUND

A grain-oriented electrical steel sheet is used, for example, as a material for an iron core of a transformer. It is required to suppress energy loss and noise in the transformer, where the energy loss is affected by the iron loss of the grain-oriented electrical steel sheet, and the noise is affected by the magnetostrictive properties of the grain-oriented electrical steel sheet.

There is a strong need particularly in recent years to reduce the energy loss in a transformer and the noise during the operation of a transformer because of energy conservation and environmental regulations. Therefore, it is very important to develop a grain-oriented electrical steel sheet having good iron loss and magnetostrictive properties.

The iron loss of a grain-oriented electrical steel sheet is mainly composed of hysteresis loss and eddy current loss. Methods that have been developed to reduce the hysteresis loss include a method of highly orienting the (110)[001] orientation, which is called GOSS orientation, in the rolling direction of the steel sheet, and a method of reducing impurities in the steel sheet. Further, methods that have been developed to reduce the eddy current loss include a method of increasing the electric resistance of the steel sheet by adding Si, and a method of applying film tension in the rolling direction of the steel sheet.

However, these methods have manufacturing limitations in achieving even lower iron loss in grain-oriented electrical steel sheets.

As a result, magnetic domain refining technology has been developed as a method to achieve even lower iron loss in grain-oriented electrical steel sheets. Magnetic domain refining technology is a technique of introducing magnetic flux non-uniformity with a physical method, such as forming grooves or locally introducing strain, to a steel sheet after final annealing or after insulating coating baking or the like to refine the width of 180° magnetic domain (main magnetic domain) formed along the rolling direction, thereby reducing the iron loss, especially the eddy current loss, of a grain-oriented electrical steel sheet.

For example, JP H06-22179 B (PTL 1) describes a technique where the iron loss is reduced from 0.80 W/kg or more to 0.70 W/kg or less by introducing a linear groove having a width of 300 μm or less and a depth of 100 μm or less on the surface of a steel sheet.

Further, JP H07-192891 A (PTL 2) describes a method of applying plasma flame in the sheet transverse direction on the surface of a steel sheet after secondary recrystallization to locally introduce thermal strain, thereby reducing the iron loss ($W_{17/50}$) to 0.680 W/kg when excited at a maximum magnetic flux density of 1.7 T and a frequency of 50 Hz in a case where the magnetic flux density ($B_8$) of the steel sheet is 1.935 T when excited with a magnetizing force of 800 A/m.

A method of introducing a linear groove as the one described in PTL 1 is referred to as heat-resistant magnetic domain refining because the magnetic domain refining effect does not disappear even if strain-removing annealing is performed after iron core forming. On the other hand, a method of introducing thermal strain as the one described in PTL 2 is referred to as non-heat-resistant magnetic domain refining because the effect of introducing thermal strain disappears due to strain-removing annealing.

In the heat-resistant magnetic domain refining, a linear groove is introduced into a steel sheet, and it is known that this treatment deteriorates the magnetic permeability of the steel sheet. On the other hand, the non-heat-resistant magnetic domain refining treatment introduces local strain into a steel sheet, which does not cause deterioration of the magnetic permeability as in the case of heat-resistant magnetic domain refining. Therefore, a steel sheet material that has been subjected to non-heat-resistant magnetic domain refining is generally used in a transformer using a laminated iron core that requires no annealing in manufacturing processes.

In the non-heat-resistant magnetic domain refining, the eddy current loss can be greatly reduced by introducing strain into a steel sheet. On the other hand, it is known that the non-heat-resistant magnetic domain refining deteriorates the hysteresis loss and the magnetostriction properties due to the introduction of strain.

Therefore, it is required to optimize the strain introduction pattern in the non-heat-resistant magnetic domain refining so that a grain-oriented electrical steel sheet with better iron loss and magnetostrictive properties than conventional ones can be developed and ultimately a transformer with better energy loss and noise properties than conventional ones can be developed.

In response to this requirement, the iron loss properties of recent grain-oriented electrical steel sheets have been greatly improved by a combination of the above methods, particularly by the high orientation and the magnetic domain refining of the steel sheet.

CITATION LIST

Patent Literature

PTL 1: JP H06-22179 B
PTL 2: JP H07-192891 A

SUMMARY

Technical Problem

However, when a grain-oriented electrical steel sheet thus produced is processed into a transformer, there is a problem that the building factor (hereinafter also referred to as "BF") increases due to the influence of high orientation, and the low iron loss properties of the material cannot be fully utilized. Note that the BF is a ratio of the iron loss of the transformer to the iron loss of the electrical steel sheet as a material. A BF value close to 1 means that the iron loss properties of the transformer are excellent.

One of the factors that increase the BF is the rotational iron loss at joints between electrical steel sheets when they are assembled as a transformer. The rotational iron loss refers to the iron loss caused in an electrical steel sheet as a material when a rotating magnetic flux having its major axis in the rolling direction is applied.

In a grain-oriented electrical steel sheet, the direction of easy magnetization is highly concentrated in the rolling direction. As a result, extremely large loss (rotational iron loss) occurs when there is a rotating magnetic flux having its major axis in the rolling direction is applied as described above. Such a rotating magnetic flux occurs at joints, especially in a transformer iron core.

On the other hand, the iron loss of an electrical steel sheet as a material is the iron loss when an alternating magnetic field having a magnetization component only in the rolling direction is applied. Therefore, when an electrical steel sheet as a material is assembled as a transformer, an increase in the rotational iron loss of the electrical steel sheet as a material leads to an increase in the iron loss of the transformer relative to the iron loss of the electrical steel sheet as a material, that is, an increase in the BF.

Therefore, to improve the building factor of a transformer, it is necessary to reduce the rotational iron loss, that is, to facilitate the rotation of magnetization.

In the non-heat-resistant magnetic domain refining, an energy beam is applied to the surface of a steel sheet, for example, after final annealing or after insulating coating baking or the like to locally introduce thermal strain. In this case, compressive stress remains with respect to the rolling direction at a location where the energy beam has been applied in a direction crossing the rolling direction. That is, in a grain-oriented electrical steel sheet in which crystal grains having the GOSS orientation (110)[001], which serves as an easy magnetization axis, are accumulated in the rolling direction, the compressive stress acts in the rolling direction due to the introduction of thermal strain, and then a magnetic domain (closure domain) having a magnetization direction in the sheet transverse direction (a direction orthogonal to the rolling direction) is formed because of an magnetoelastic effect.

The magnetoelastic effect is an effect that, when tensile stress is applied to a grain-oriented electrical steel sheet, the direction of the tensile stress becomes energetically stable, and when compressive stress is applied to a grain-oriented electrical steel sheet, a direction orthogonal to the compressive stress becomes energetically stable.

The closure domain thus formed has a magnetization component in a direction orthogonal to the rolling direction, which can reduce the rotational iron loss and is advantageous for improving the building factor.

However, it is known that the introduction of thermal strain for the formation of a closure domain simultaneously leads to an increase in magnetostriction, that is, an increase in transformer noise.

Therefore, to achieve both an improvement in building factor and a reduction in noise compared to prior art, it is necessary to develop a new strain introduction pattern that effectively suppresses an increase in magnetostriction and an increase in building factor.

It could thus be helpful to provide a grain-oriented electrical steel sheet that achieves both low iron loss and low magnetostriction and has excellent transformer properties.

Solution to Problem

We made intensive studies to solve the above problem.

First, we studied methods that can reduce the rotational iron loss, because the rotational iron loss causes an increase in the building factor.

As a result, we found that, in addition to the formation of a closure domain as described above, the formation of a magnetic domain having a magnetization component in a direction different from the rolling direction (hereinafter also referred to as "auxiliary magnetic domain") when a rotating magnetic field is applied can also reduce the rotational iron loss. We also found that such an auxiliary magnetic domain tends to be formed with a region having locally high magnetostatic energy, such as a defect and strain, being an initiation point.

Next, we studied a suitable distribution of regions for forming such an auxiliary magnetic domain in a steel sheet as a material that has been subjected to non-heat-resistant magnetic domain refining. FIG. 1 illustrates the candidate locations for forming an auxiliary magnetic domain conceived during the study.

The candidates include (I) inside a closure domain, (II) ends of a closure domain, and (III) a region between irradiation lines.

Among these candidates, a closure domain has already been formed (I) inside a closure domain, and therefore the contribution of the formation of an auxiliary magnetic domain inside a closure domain to the reduction of rotational iron loss is small.

In (III) a region between irradiation lines, although the formation of an auxiliary magnetic domain reduces the rotational iron loss, there is concern that the magnetostriction and hysteresis loss properties may be deteriorated due to an increase in strain. Further, in this case, a new energy beam irradiation process is required in addition to the process of applying an energy beam crossing the rolling direction, which is undesirable in the manufacture.

On the other hand, (II) ends of a closure domain can eliminate the concerns of the case (III), and an auxiliary magnetic domain is formed on the outside of a closure domain, which is expected to reduce the rotational iron loss.

A further study was carried out on the strain distribution with which the (II) ends of a closure domain become the nuclei of locations for forming an auxiliary magnetic domain.

The following describes the experimental results that led to the present disclosure.

A steel strip of a grain-oriented electrical steel sheet with a thickness of 0.23 mm produced with a known method was irradiated with an electron beam having a ring-shaped or Gaussian-shaped beam profile as an energy beam at different powers to form a thermal strain-imparted region (magnetic domain refining treatment). In this case, an electron beam with a beam diameter of 300 μm was used. As used herein, a beam having a ring-shaped beam profile means that the beam has two peaks when the beam profile is obtained by scanning in any direction in a two-dimensional plane where the beam is scanned. FIG. 2 schematically illustrates such a beam profile.

After the electron beam irradiation, a sample was cut out from the steel strip of the grain-oriented electrical steel sheet, and the magnetic flux density ($B_8$) and the iron loss (material iron loss: $W_{17/50}$) were measured as magnetic properties with the single sheet magnetic measurement method described in JIS C2556.

In addition, a 3-phase stacked transformer (iron core weight 500 kg) was prepared with the steel sheet, and the iron loss (transformer core loss: $W_{17/50}$ (WM)) was measured at a frequency of 50 Hz when the magnetic flux density in the iron core leg portion was 1.7 T. The transformer core loss $W_{17/50}$ (WM) at 1.7 T and 50 Hz was taken as a no-load loss measured using a wattmeter. With the value of the $W_{17/50}$ (WM) and the value of the $W_{17/50}$ measured with the single sheet magnetic measurement method, the building factor was calculated using the following formula (1).

$$\text{Building factor}=W_{17/50}(WM)/W_{17/50} \quad (1)$$

Further, a 3-phase transformer model for transformer was prepared using the grain-oriented electrical steel sheet after the electron beam irradiation as described above. The transformer model was excited in a soundproof room under the conditions of a maximum magnetic flux density Bm of 1.7 T and a frequency of 50 Hz, and the noise level (dBA) was measured using a sound level meter.

In the same manner as described above, a sample was cut out from the steel strip, and the strain distribution in the rolling direction around a thermal strain-imparted region introduced by the electron beam irradiation was measured with a strain scanning method using high-intensity X-rays. FIG. 3 schematically illustrates a graph of the curve of strain amount, as an example of the strain distribution.

As indicated in the graph of the curve of strain amount in FIG. 3, two peaks were formed in the strain distribution near the ends of the thermal strain-imparted region. The average of the strain amounts at both ends of the thermal strain-imparted region (average strain amount) was indicated as A, and the strain amount at the center of the thermal strain-imparted region was indicated as B. The difference between the strain amounts ΔAB (=A−B) was calculated. We investigated the relationship between the ΔAB and the material iron loss $W_{17/50}$, the relationship between the ΔAB and the transformer noise level, and the relationship between the ΔAB and the transformer building factor, respectively.

The strain amount illustrated in FIG. 3 can be calculated using the following formula, where the d value of a reference point (strain-free point) is d0, and the d value of the measured point is d1. In other words, tensile strain is positive, and compressive strain is negative.

$$\{(d1-d0)/d0\}\times 100 \text{(unit: \%)}$$

The relationship between the difference in strain amount ΔAB and the material iron loss $W_{17/50}$ is illustrated in FIG. 4, the relationship between the difference in strain amount ΔAB and the transformer noise level is illustrated in FIG. 5, and the relationship between the difference in strain amount ΔAB and the transformer building factor is illustrated in FIG. 6.

It can be confirmed from FIG. 4 that the change in $W_{17/50}$ is small in a region where the difference in strain amount ΔAB is positive (exceeding 0.000%). The reason is considered as follows. Because the magnetic domain refining is promoted by interrupting the flow of magnetic poles, the strain distribution in the thermal strain-imparted region has little adverse effect on the reduction of iron loss in a region where the ΔAB is positive (exceeding 0.000%). On the other hand, deterioration of the iron loss properties is confirmed in a region where the ΔAB is negative. This is probably because the hysteresis loss also increases due to an increase in the total amount of strain.

It can be confirmed from FIG. 5 that the transformer noise is suppressed in a region where the difference in strain amount ΔAB is positive (exceeding 0.000%). The reason is considered as follows. In the distribution, the thermal strain for magnetic domain refining is concentrated at both ends, so that the total amount of strain inside the thermal strain-imparted region decreases.

It can be seen from FIG. 6 that the building factor tends to decrease as the difference in strain amount ΔAB increases. The reason is considered as follows. Concentration of strain in regions of the (II) ends of a closure domain accelerates the above-mentioned formation of auxiliary magnetic domain and reduces the rotational iron loss, thereby reducing the iron loss of the transformer.

It is understood from the above experimental results that, in the strain distribution in the rolling direction of the thermal strain-imparted region, when the strain at both ends of the thermal strain-imparted region is tensile strain larger than the strain at the center of the thermal strain-imparted region, that is, when it is a region where the ΔAB is positive (exceeding 0.000%), the transformer noise and the building factor properties can be improved while maintaining the effect of reducing iron loss of the magnetic domain refining, and when the ΔAB is 0.040% or more and 0.200% or less, the effect of reducing the noise and reducing the building factor is enforced.

In other words, we found that it is preferable to form a linear thermal strain-imparted region in a direction crossing the rolling direction and to have a distribution in which tensile strain is formed where the strain at both ends in the rolling direction is larger than the strain at the center in the rolling direction in the thermal strain-imparted region, and especially when the difference ΔAB (=A−B) between the average strain amount A at both ends of the thermal strain-imparted region and the strain amount B at the center of the thermal strain-imparted region is 0.040% or more and 0.200% or less, it is possible to obtain a grain-oriented electrical steel sheet with better transformer properties.

The present disclosure is based on these findings and further studies. We thus provide the following.

[1] A grain-oriented electrical steel sheet having a thermal strain-imparted region extending linearly in a direction crossing a rolling direction, wherein
in a strain distribution in a rolling direction of the thermal strain-imparted region, strain at both ends of the thermal strain-imparted region is tensile strain larger than strain at a center of the thermal strain-imparted region.

[2] The grain-oriented electrical steel sheet according to aspect [1], wherein in the strain distribution in a rolling direction of the thermal strain-imparted region, a difference between an average of strain amounts at both ends of the thermal strain-imparted region, which is indicated as A, and a strain amount at a center of the thermal strain-imparted region, which is indicated as B, is 0.040% or more and 0.200% or less, where the difference is indicated as ΔAB and is obtained by ΔAB=A−B.

[3] The grain-oriented electrical steel sheet according to aspect [2], wherein the ΔAB is 0.050% or more and 0.150% or less.

Advantageous Effect

According to the present disclosure, it is possible to obtain a grain-oriented electrical steel sheet that can reduce the energy loss and noise of a transformer.

DETAILED DESCRIPTION (Grain-Oriented Electrical Steel Sheet)

Figure 1:
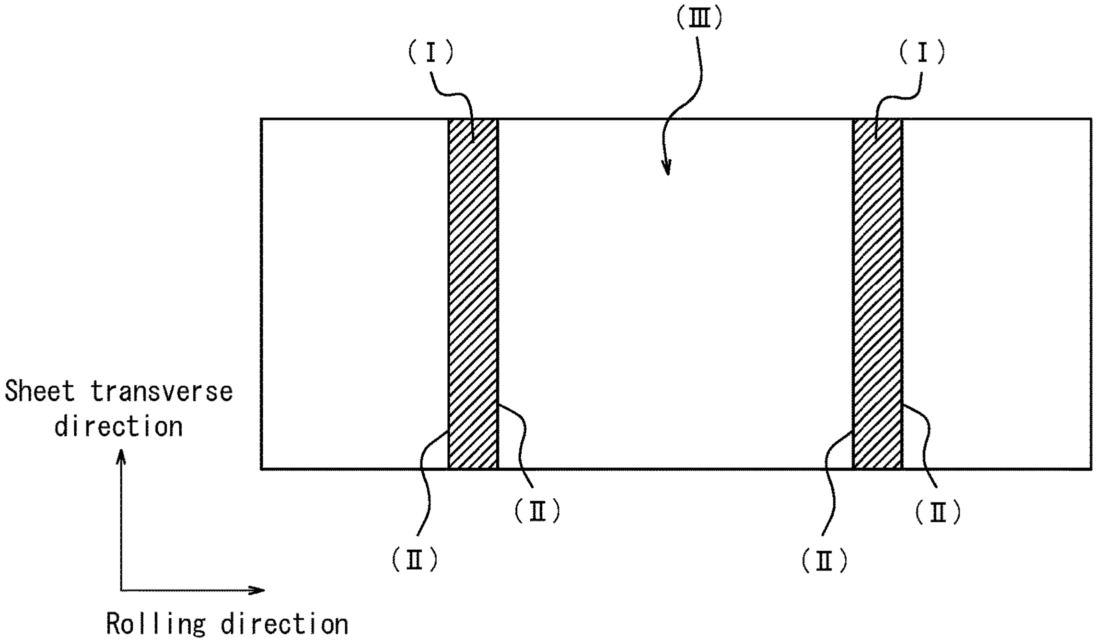
FIG. 1 schematically illustrates candidate locations for forming a magnetic domain with a magnetization component in a different direction from the rolling direction in a steel sheet material that has been subjected to non-heat-resistant magnetic domain refining, which are used in the studies leading to the present disclosure.
Figure 2:
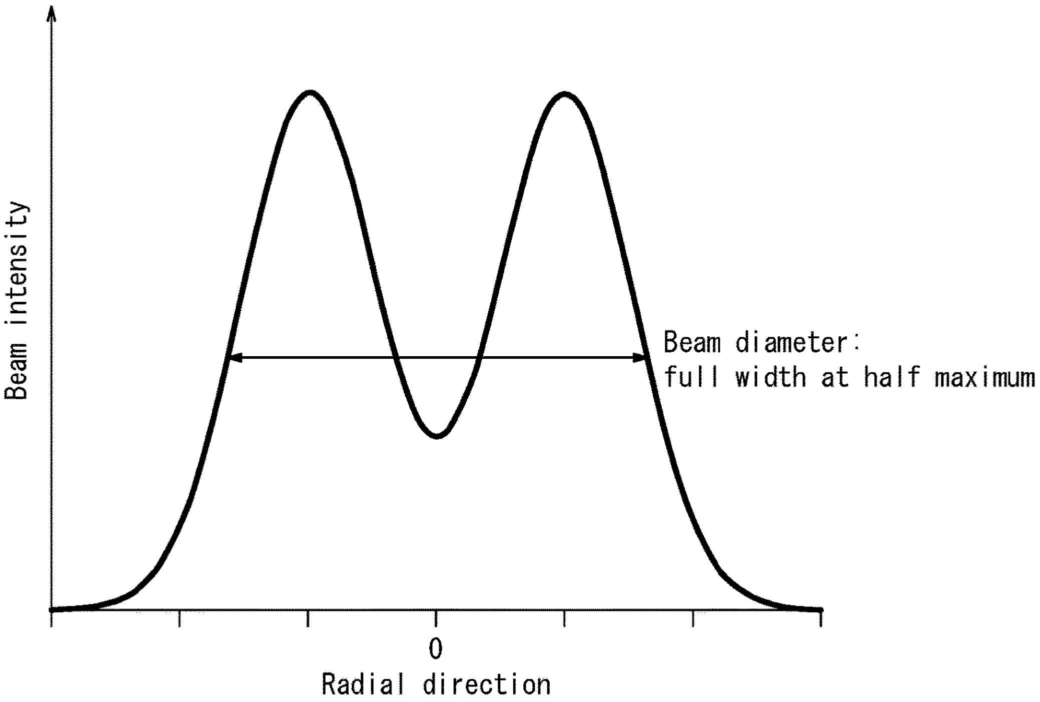
FIG. 2 schematically illustrates an example of a ring-shaped beam profile.
Figure 3:
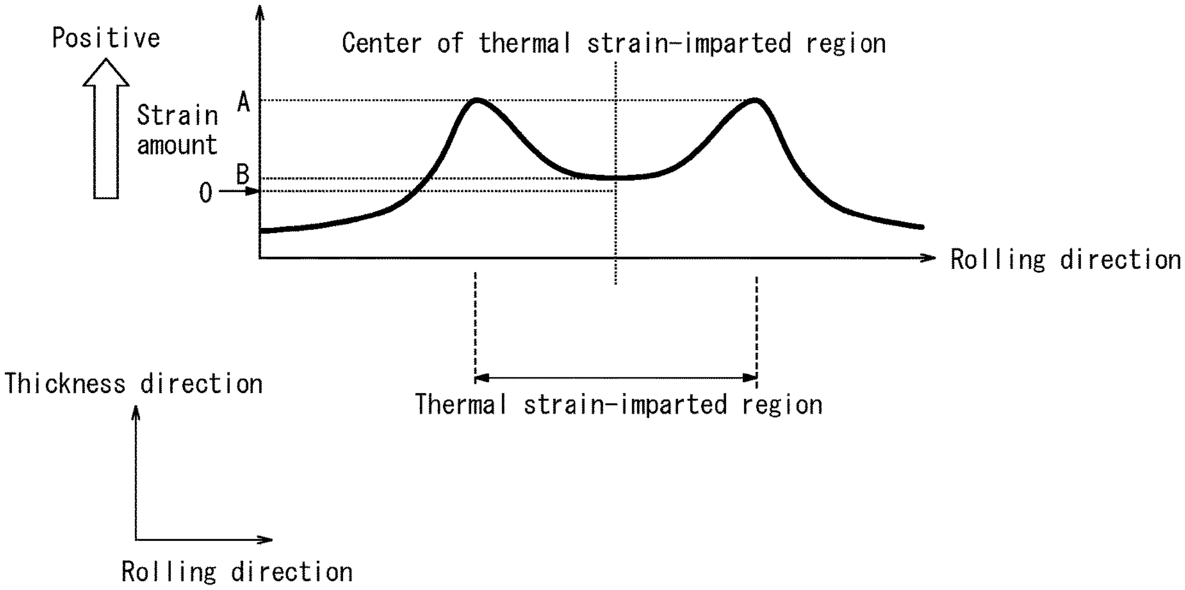
FIG. 3 schematically illustrates an example of a strain distribution in a thermal strain-imparted region of the grain-oriented electrical steel sheet of the present disclosure.
Figure 4:
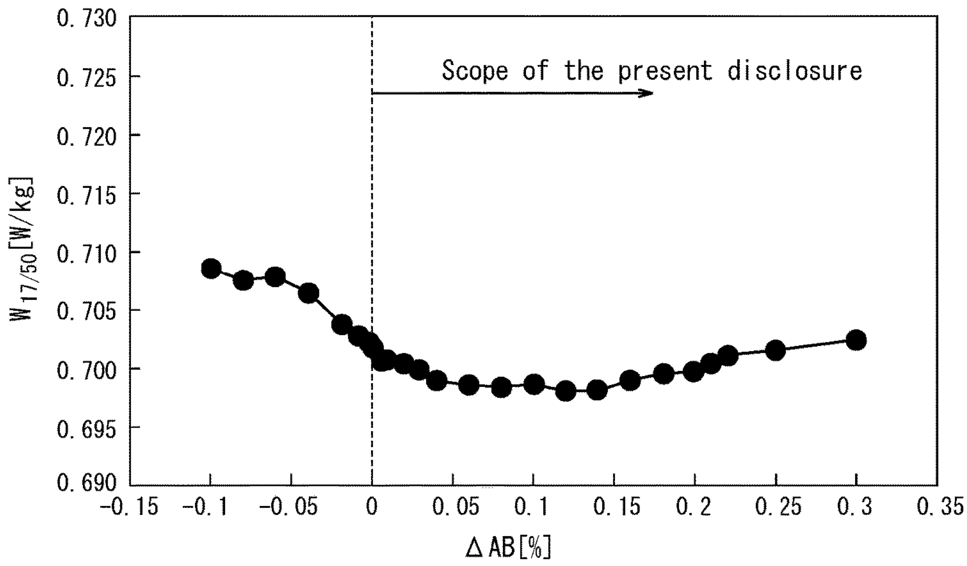
FIG. 4 illustrates the relationship between the difference in strain amount ΔAB (=A−B) and the material iron loss $W_{17/50}$.
Figure 5:
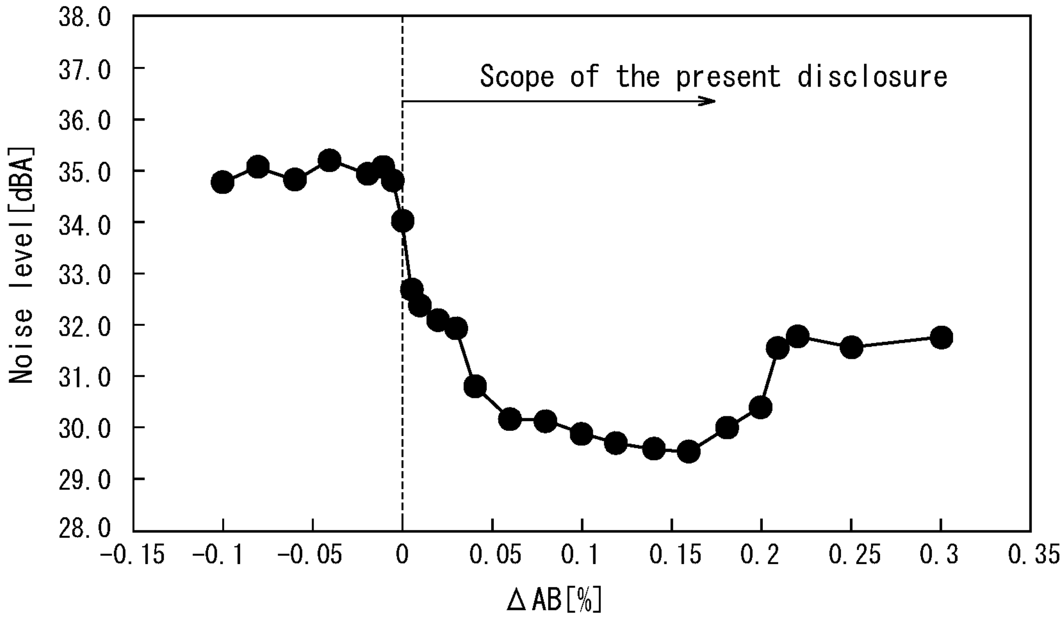
FIG. 5 illustrates the relationship between the difference in strain amount ΔAB (=A−B) and the transformer noise level.
Figure 6:
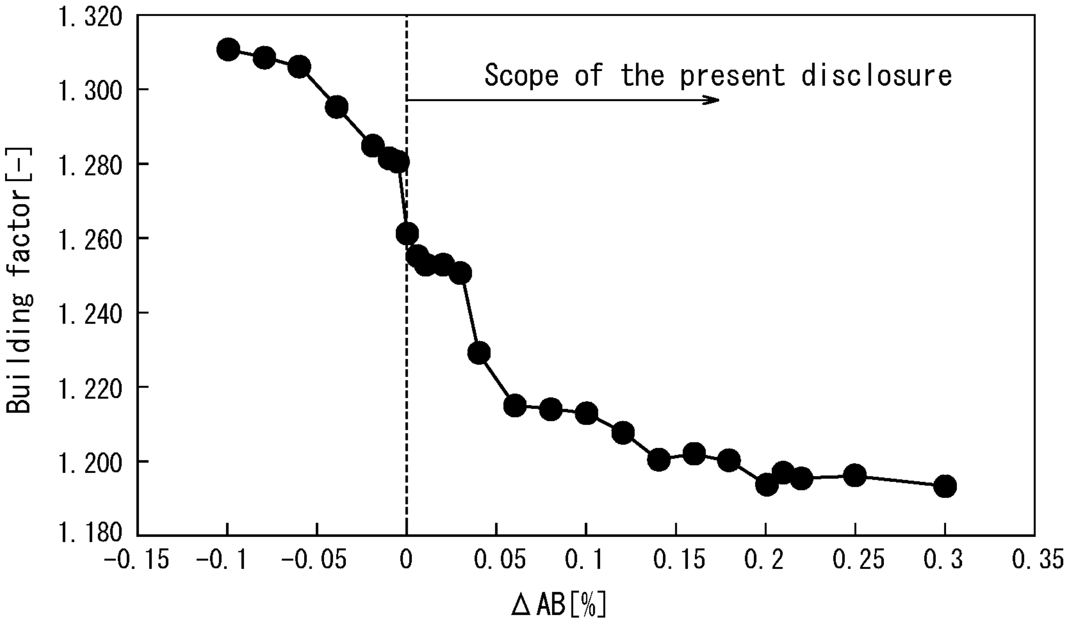
FIG. 6 illustrates the relationship between the difference in strain amount ΔAB (=A−B) and the transformer building factor.

The following describes suitable embodiments of the present disclosure in detail.

<Chemical Composition of Grain-Oriented Electrical Steel Sheet>

The chemical composition of the grain-oriented electrical steel sheet of the present disclosure or a slab used as the material thereof is a chemical composition capable of secondary recrystallization. In the case of using an inhibitor, for example, Al and N are added in appropriate amounts when using an AlN-based inhibitor, and Mn and Se and/or S are added in appropriate amounts when using a MnS/MnSe-based inhibitor. Of course, both an AlN-based inhibitor and a MnS/MnSe-based inhibitor may be used together.

In the case of using an inhibitor, preferable contents of Al, N, S and Se in the grain-oriented electrical steel sheet or a slab used as the material thereof are as follows, respectively.

Al: 0.010 mass % to 0.065 mass %,
N: 0.0050 mass % to 0.0120 mass %,
S: 0.005 mass % to 0.030 mass %, and
Se: 0.005 mass % to 0.030 mass %.

An inhibitor-less grain-oriented electrical steel sheet in which the contents of Al, N, S, and Se are limited may be used in the present disclosure. In this case, the contents of Al, N, S and Se in the grain-oriented electrical steel sheet or a slab used as the material thereof are preferably suppressed as follows, respectively.

Al: less than 0.010 mass %,
N: less than 0.0050 mass %,
S: less than 0.0050 mass %, and
Se: less than 0.0050 mass %.

The following describes the basic components and optionally added components of the grain-oriented electrical steel sheet of the present disclosure or a slab used as the material thereof in detail.

C: 0.08 Mass % or Less

C is a basic component and is added to improve the microstructure of a hot-rolled sheet. When the C content exceeds 0.08 mass %, it is difficult to reduce the C content during the manufacturing processes to 50 mass ppm or less where magnetic aging does not occur. Therefore, the C content is preferably 0.08 mass % or less. Because secondary recrystallization occurs even in a steel material containing no C, there is no need to set a lower limit for the C content. Therefore, the C content may be 0 mass %.

Si: 2.0 Mass % to 8.0 Mass %

Si is a basic component and is an element effective in increasing the electric resistance of steel and improving the iron loss properties. Therefore, the Si content is preferably 2.0 mass % or more. On the other hand, when the Si content exceeds 8.0 mass %, the workability and the sheet passing properties may deteriorate, and the magnetic flux density may also decrease. Therefore, the Si content is desirably 8.0 mass % or less. The Si content is more preferably 2.5 mass % or more. The Si content is more preferably 7.0 mass % or less.

Mn: 0.005 Mass % to 1.0 Mass %

Mn is a basic component and is an element necessary for improving the hot workability. Therefore, the Mn content is preferably 0.005 mass % or more. On the other hand, when the Mn content exceeds 1.0 mass %, the magnetic flux density may deteriorate. Therefore, the Mn content is preferably 1.0 mass % or less. The Mn content is more preferably 0.01 mass % or more. The Mn content is more preferably 0.9 mass % or less.

In addition to the basic components listed above, Ni, Sn, Sb, Cu, P, Mo, and Cr may be used as appropriate in the present disclosure as optionally added components, which are known to be effective in improving the magnetic properties.

That is, the grain-oriented electrical steel sheet or a slab used as the material thereof may suitably contain at least one selected from the group consisting of Ni: 0.03 mass % to 1.50 mass %,
Sn: 0.01 mass % to 1.50 mass %,
Sb: 0.005 mass % to 1.50 mass %,
Cu: 0.03 mass % to 3.0 mass %,
P: 0.03 mass % to 0.50 mass %,
Mo: 0.005 mass % to 0.10 mass %, and
Cr: 0.03 mass % to 1.50 mass %.

Among the above optionally added components, Ni is useful for improving the microstructure of a hot-rolled sheet and improving the magnetic properties. When the Ni content is less than 0.03 mass %, the contribution to magnetic properties is small. On the other hand, when the Ni content exceeds 1.50 mass %, secondary recrystallization becomes unstable, and the magnetic properties may deteriorate. Therefore, the Ni content is desirably in a range of 0.03 mass % to 1.50 mass %.

Among the above optionally added components, Sn, Sb, Cu, P, Mo and Cr are also elements that improve the magnetic properties like Ni. In any case, when the content is less than the lower limit, the effect is insufficient, and when the content exceeds the upper limit, the growth of secondary recrystallized grains is suppressed, resulting in deterioration of magnetic properties. Therefore, the content of each of Sn, Sb, Cu, P, Mo and Cr is preferably in the range described above.

The balance other than the above components is Fe and inevitable impurities.

Among the above components, C is decarburized during primary recrystallization annealing, and Al, N, S, and Se are purified during secondary recrystallization annealing. Therefore, the contents of these components can be reduced to the level of inevitable impurities in a steel sheet after secondary recrystallization annealing (a grain-oriented electrical steel sheet after final annealing).

<Manufacture of Grain-Oriented Electrical Steel Sheet (Before Forming Thermal Strain-Imparted Region)>

The grain-oriented electrical steel sheet of the present disclosure can be manufactured with the following procedure before the formation of a thermal strain-imparted region.

A steel material (slab) of a grain-oriented electrical steel sheet with the chemical system described above is subjected to hot rolling and then subjected to hot-rolled sheet annealing as required. Next, cold rolling is performed once or twice or more with intermediate annealing performed therebetween to obtain a steel strip with a final sheet thickness. The steel strip is then subjected to decarburization annealing, applied with an annealing separator mainly composed of MgO, then rolled into a coil, and subjected to final annealing for the purpose of secondary recrystallization and formation of forsterite film. If necessary, the steel strip after final annealing is subjected to flattening annealing, and then an insulating coating (such as a magnesium phosphate-based tension coating) is formed. In this way, a grain-oriented electrical steel sheet before the formation of a thermal strain-imparted region can be obtained.

<Formation of Thermal Strain-Imparted Region>

Next, a thermal strain-imparted region is formed in the grain-oriented electrical steel sheet. A thermal strain-imparted region can be formed by non-heat-resistant magnetic domain refining, which is one type of magnetization refining. In the non-heat-resistant magnetic domain refining, for example, an energy beam is applied to the surface of the steel sheet after final annealing or after the formation of an insulating coating to locally introduce thermal strain (to form a thermal strain-imparted region).

Method of Applying Energy Beam

During the formation of a thermal strain-imparted region, the strain distribution of the present disclosure can be formed more effectively by using an energy beam having a circular (ring-shaped) intensity distribution as seen in a ring-mode laser system.

The beam source of the energy beam may be a laser, an electron beam, or the like, any of which may be used to obtain the desired strain distribution. In the case of using a laser, a ring-mode laser system may be employed. In the case of using an electron beam, a circular (ring-shaped) convex portion may be formed on the cathode surface. In this way, the strain distribution of the present disclosure can be formed.

Direction of Applying Energy Beam

During the manufacture of the grain-oriented electrical steel sheet of the present disclosure, a thermal strain-imparted region can be linearly formed in the steel sheet by applying the above-described energy beam such as an electron beam.

Specifically, one or more electron guns are used to introduce linear thermal strain (form a thermal strain-imparted region) while applying the beam so as to cross the rolling direction. The scanning direction of the beam is preferably in a range of 60° to 120° with respect to the rolling direction, and in this range, it is more preferable to make the direction 90° with respect to the rolling direction, that is, to scan along the sheet transverse direction. This is because when the deviation of the scanning direction from the sheet transverse direction increases, the amount of strain introduced into the steel sheet increases, resulting in deterioration of magnetostriction properties.

The energy beam may be applied continuously along the scanning direction (continuous linear irradiation) or may be applied by a repetition of stopping and moving (dot irradiation), as long as the other requirements of the present disclosure are satisfied. Both irradiation forms can provide the effects of improving the building factor and the magnetostriction properties of the present disclosure.

Note that both the "continuous linear" and the "dot" described above are forms of "linear".

The following is a more detailed description of suitable conditions for applying an electron beam during the manufacture of the grain-oriented electrical steel sheet of the present disclosure.

Accelerating Voltage: 60 kV or More and 300 kV or Less

As the accelerating voltage increases, the electrons move more and more straightly, and the thermal effect on an area where the electron beam is not applied decreases. Therefore, the accelerating voltage is preferably high. For this reason, the accelerating voltage is preferably 60 kV or more. The accelerating voltage is more preferably 90 kV or more, and still more preferably 120 kV or more On the other hand, a too high accelerating voltage renders it difficult to shield X-rays formed by the application of the electron beam. Therefore, the accelerating voltage is preferably 300 kV or less from the viewpoint of practice. The accelerating voltage is more preferably 200 kV or less.

Spot Diameter (Beam Diameter): 300 μm or Less

As the spot diameter decreases, it is easier to locally introduce strain. Therefore, the spot diameter is preferably small. The spot diameter (beam diameter) of the electron beam is preferably 300 μm or less. The spot diameter (beam diameter) of the electron beam is more preferably 280 μm or less and still more preferably 260 μm or less. Note that the "spot diameter" refers to the full width at half maximum of a beam profile obtained with a slit method using a slit with a width of 30 μm.

Beam Current: 0.5 mA or More and 40 mA or Less

The beam current is preferably small from the viewpoint of beam diameter. This is because, as the current increases, the beam diameter tends to increase due to Coulomb repulsion. Therefore, the beam current is preferably 40 mA or less. On the other hand, a too small beam current cannot provide sufficient energy to form strain. Therefore, the beam current is preferably 0.5 mA or more.

Electron Beam Power: 300 W or More and 4000 W or Less

The electron beam power is calculated as the product of the accelerating voltage and the beam current. Considering the amount of strain introduced, the electron beam power is preferably small. This is because increasing the electron beam power leads to excessive strain introduction, which deteriorates the hysteresis loss properties more than it improves the eddy current loss properties, and also deteriorates the noise properties. Therefore, under conditions where the accelerating voltage and the beam current satisfy the above suitable ranges, the electron beam power is preferably 4000 W or less. On the other hand, a too small electron beam power cannot provide sufficient energy to form strain. Therefore, the electron beam power is preferably 300 W or more.

Degree of Vacuum in Environment of Applying Beam

An electron beam is scattered by gas molecules, causing, for example an increase in beam diameter and halo diameter and a decrease in energy. Therefore, the degree of vacuum in an environment where the beam is applied is preferably high, and the pressure is desirably 3 Pa or less. The lower limit is not particularly limited. However, a too low degree of vacuum increases the cost of a vacuum system such as a vacuum pump. Therefore, the degree of vacuum in an environment where the beam is applied is desirably $10^{-5}$ Pa or more in practice.

The following is a more detailed description of conditions for applying a laser during the manufacture of the grain-oriented electrical steel sheet of the present disclosure.

Laser Power: 20 W or More and 500 W or Less

Considering the amount of strain introduced, the laser power is preferably small. This is because increasing the laser power leads to excessive strain introduction, which deteriorates the hysteresis loss properties more than it improves the eddy current loss properties, and also deteriorates the noise properties. Therefore, the laser power is preferably 500 W or less. On the other hand, a too small laser power cannot provide sufficient energy to form strain. Therefore, the laser power is preferably 20 W or more.

<Strain Property in Grain-Oriented Electrical Steel Sheet>

Strain Distribution

A strain distribution in the rolling direction of the thermal strain-imparted region on the surface of the steel sheet may be measured with the EBSD-Wilkinson method. In the EBSD-Wilkinson method, for example, an electron beam is applied on the surface of the steel sheet, Kikuchi pattern is obtained at each measurement point, and the strain amount is calculated based on the deformation amount of the Kikuchi pattern at each point using analysis software such as CrossCourt with a strain-free point as a reference point.

The thermal strain-imparted region in the present disclosure refers to the same region as a linear closure domain region formed by the energy beam linearly applied on the steel sheet. The length in the rolling direction of the closure domain formed on the surface of the steel sheet (the same as the length of the thermal strain-imparted region) can be measured by obtaining a magnetic domain pattern on the surface of the steel sheet using a commercially available domain viewer.

Average Strain Amount A and Strain Amount B

The strain distribution in the rolling direction of the thermal strain-imparted region on the surface of the steel sheet is measured with the above measurement method, and the average of the strain amounts at both ends in the rolling direction of the thermal strain-imparted region is indicated as A, and the strain amount at the center of the rolling direction of the thermal strain-imparted region is indicated as B. The strain amounts at both ends in the rolling direction may be the same or different.

When the difference between the A and the B, which is ΔAB (A−B), is positive (exceeding 0.000%), the effect of the present disclosure can be obtained. When the difference is 0.040% or more and 0.200% or less, a grain-oriented electrical steel sheet with better properties can be obtained. The ΔAB is more preferably 0.050% or more. The ΔAB is more preferably 0.160% or less.

Examples

The following describes the present disclosure based on examples. The following examples merely represent preferred examples, and the present disclosure is not limited to these examples. It is possible to carry out the present disclosure by making modifications without departing from the scope and sprit of the present disclosure, and such embodiments are also encompassed by the technical scope of the present disclosure.

In this example, a slab having a chemical composition containing the components listed in Table 1 with the balance being Fe and inevitable impurities was used as a material of a grain-oriented electrical steel sheet. The slab was subjected to hot rolling, hot-rolled sheet annealing, cold rolling once, decarburization annealing, annealing separator application, and final annealing in the stated order and under predetermined conditions, respectively, to obtain a steel strip of a grain-oriented electrical steel sheet with a thickness of 0.23 mm.

[Table 1]

TABLE 1

| Content (mass %) | | | | | | | | |
|---|---|---|---|---|---|---|---|---|
| C | Si | Mn | Ni | Al | N | Se | S | O |
| 0.08 | 3.4 | 0.1 | 0.01 | 0.026 | 0.007 | 0.011 | 0.003 | 0.0025 |

The steel strip of the grain-oriented electrical steel sheet was used as a sample, and the sample was irradiated with an energy beam. Either a laser or an electron beam was used as the beam source of the energy beam (as listed in Table 2), and the irradiation was either continuous linear irradiation or dot irradiation (as listed in Table 2). In this way, a thermal strain-imparted region was formed on the surface of the steel strip of the grain-oriented electrical steel sheet (magnetic domain refining treatment). The dot irradiation refers to a form of irradiation in which the energy beam is applied by a repetition of stopping and moving in the scanning direction.

The conditions of applying the energy beam, for both laser and electron beam, were as follows: direction of applying the energy beam: approximately 90° with respect to the rolling direction, and beam power: 0.6 kW to 6 kW (accelerating voltage: 60 kW to 150 kV, and beam current: 1 mA to 40 mA). In the case of electron beam, the degree of vacuum in an environment where the beam was applied was 0.3 Pa. The beam to be applied in both cases had a ring-shaped profile, and a beam with a beam diameter of 200 μm was used. To change the values of the average strain amount A, the strain amount B, and the ΔAB, the beam was applied by adjusting conditions such as the beam power, the energy difference between the energy local maximum value in the ring-shaped profile and the energy local minimum value at the center of the profile, and the distance between the energy local maximum values.

A sample was cut out from the steel strip of the grain-oriented electrical steel sheet in which a thermal strain-imparted region had been formed, and the magnetic flux density ($B_8$) and the iron loss (material iron loss: $W_{17/50}$) were measured as magnetic properties with the single sheet magnetic measurement method described in JIS C2556. In addition, a 3-phase stacked transformer (iron core mass 500 kg) was prepared with the steel strip, and the iron loss (transformer core loss: $W_{17/50}$ (WM)) was measured at a frequency of 50 Hz when the magnetic flux density in the iron core leg portion was 1.7 T. The transformer core loss $W_{17/50}$ (WM) at 1.7 T and 50 Hz was taken as a no-load loss measured using a wattmeter. With the value of the $W_{17/50}$ (WM) and the value of the $W_{17/50}$ measured with the single sheet magnetic measurement method, the building factor (BF) was calculated using the following formula (1). The results are listed in Table 2.

$$\text{Building factor}=W_{17/50}(WM)/W_{17/50} \quad (1)$$

Further, a 3-phase transformer model for transformer was prepared using the grain-oriented electrical steel sheet that had been subjected to the magnetic domain refining treatment as described above. The transformer model was excited in a soundproof room under the conditions of a maximum magnetic flux density Bm of 1.7 T and a frequency of 50 Hz, and the noise level (dBA) was measured using a sound level meter. The results are listed in Table 2.

In the same manner as described above, a sample was cut out from the steel strip, and the strain distribution in the rolling direction around the thermal strain-imparted region was measured with the EBSD-Wilkinson method. Further, the length in the rolling direction of the closure domain formed on the surface of the steel sheet (the same as the length of the thermal strain-imparted region) was measured using a commercially available domain viewer (MV-95 manufactured by Sigma Hi-Chemical, Inc.). The average of the strain amounts at both ends of the thermal strain-imparted region (average strain amount) was indicated as A, and the strain amount at the center of the thermal strain-imparted region was indicated as B. The difference between the strain amounts ΔAB (=A−B) was calculated. Note that tensile strain was positive, and compressive strain was negative. These values are listed in Table 2.

TABLE 2

| No. | Beam source | Irradiation form | A [%] | B [%] | ΔAB [%] | $W_{17/50}$ [W/kg] | Noise level [dBA] | BF [—] | Remarks |
|---|---|---|---|---|---|---|---|---|---|
| 1 | Laser | Continuous linear | 0.050 | 0.050 | 0.000 | 0.700 | 38.0 | 1.42 | Comparative Example |
| 2 | Laser | Continuous linear | 0.050 | 0.030 | 0.020 | 0.700 | 38.0 | 1.30 | Example |
| 3 | Laser | Continuous linear | 0.050 | 0.020 | 0.030 | 0.700 | 38.0 | 1.30 | Example |
| 4 | Laser | Continuous linear | 0.050 | 0.010 | 0.040 | 0.700 | 35.0 | 1.25 | Example |
| 5 | Laser | Continuous linear | 0.050 | −0.025 | 0.075 | 0.695 | 34.0 | 1.25 | Example |
| 6 | Laser | Continuous linear | 0.100 | 0.000 | 0.100 | 0.695 | 34.0 | 1.25 | Example |
| 7 | Laser | Continuous linear | 0.100 | −0.050 | 0.150 | 0.695 | 34.0 | 1.25 | Example |
| 8 | Laser | Continuous linear | 0.130 | −0.070 | 0.200 | 0.700 | 35.0 | 1.25 | Example |
| 9 | Laser | Continuous linear | 0.160 | −0.090 | 0.250 | 0.700 | 38.0 | 1.30 | Example |
| 10 | Laser | Dot | 0.055 | 0.055 | 0.000 | 0.695 | 35.0 | 1.40 | Comparative Example |
| 11 | Laser | Dot | 0.055 | 0.035 | 0.020 | 0.695 | 35.0 | 1.25 | Example |
| 12 | Laser | Dot | 0.055 | 0.025 | 0.030 | 0.695 | 35.0 | 1.25 | Example |
| 13 | Laser | Dot | 0.055 | 0.015 | 0.040 | 0.695 | 32.0 | 1.23 | Example |
| 14 | Laser | Dot | 0.055 | −0.020 | 0.075 | 0.690 | 31.0 | 1.23 | Example |
| 15 | Laser | Dot | 0.110 | 0.010 | 0.100 | 0.690 | 31.0 | 1.23 | Example |
| 16 | Laser | Dot | 0.110 | −0.090 | 0.200 | 0.695 | 35.0 | 1.25 | Example |
| 17 | Laser | Dot | 0.140 | −0.110 | 0.250 | 0.695 | 35.0 | 1.25 | Example |
| 18 | Laser | Dot | 0.170 | −0.130 | 0.300 | 0.695 | 35.0 | 1.25 | Example |
| 19 | Electron beam | Continuous linear | 0.060 | 0.060 | 0.000 | 0.695 | 35.0 | 1.38 | Comparative Example |
| 20 | Electron beam | Continuous linear | 0.060 | 0.040 | 0.020 | 0.695 | 35.0 | 1.25 | Example |
| 21 | Electron beam | Continuous linear | 0.060 | 0.030 | 0.030 | 0.695 | 35.0 | 1.25 | Example |
| 22 | Electron beam | Continuous linear | 0.060 | 0.020 | 0.040 | 0.695 | 32.0 | 1.23 | Example |
| 23 | Electron beam | Continuous linear | 0.060 | −0.015 | 0.075 | 0.690 | 31.0 | 1.23 | Example |
| 24 | Electron beam | Continuous linear | 0.120 | 0.020 | 0.100 | 0.690 | 31.0 | 1.23 | Example |
| 25 | Electron beam | Continuous linear | 0.120 | −0.080 | 0.200 | 0.695 | 35.0 | 1.25 | Example |
| 26 | Electron beam | Continuous linear | 0.160 | −0.090 | 0.250 | 0.695 | 35.0 | 1.25 | Example |
| 27 | Electron beam | Continuous linear | 0.180 | −0.120 | 0.300 | 0.695 | 35.0 | 1.25 | Example |
| 28 | Electron beam | Dot | 0.070 | 0.070 | 0.000 | 0.690 | 32.0 | 1.36 | Comparative Example |
| 29 | Electron beam | Dot | 0.070 | 0.050 | 0.020 | 0.690 | 32.0 | 1.23 | Example |
| 30 | Electron beam | Dot | 0.070 | 0.040 | 0.030 | 0.690 | 32.0 | 1.23 | Example |
| 31 | Electron beam | Dot | 0.070 | 0.030 | 0.040 | 0.685 | 30.0 | 1.20 | Example |
| 32 | Electron beam | Dot | 0.070 | −0.005 | 0.075 | 0.685 | 30.0 | 1.20 | Example |
| 33 | Electron beam | Dot | 0.140 | 0.040 | 0.100 | 0.685 | 30.0 | 1.20 | Example |
| 34 | Electron beam | Dot | 0.140 | −0.060 | 0.200 | 0.690 | 32.0 | 1.23 | Example |
| 35 | Electron beam | Dot | 0.170 | −0.080 | 0.250 | 0.690 | 32.0 | 1.23 | Example |
| 36 | Electron beam | Dot | 0.190 | −0.110 | 0.300 | 0.690 | 32.0 | 1.23 | Example |
| 37 | Laser | Continuous linear | 0.010 | 0.030 | −0.020 | 0.705 | 50.0 | 1.45 | Comparative Example |
| 38 | Laser | Dot | 0.020 | 0.070 | −0.050 | 0.700 | 45.0 | 1.40 | Comparative Example |
| 39 | Electron beam | Continuous linear | 0.020 | 0.040 | −0.020 | 0.700 | 50.0 | 1.45 | Comparative Example |
| 40 | Electron beam | Dot | 0.030 | 0.080 | −0.050 | 0.695 | 45.0 | 1.40 | Comparative Example |

According to Table 2, the effects of reducing noise and reducing building factor can be confirmed, regardless of the energy beam source and the irradiation form, under the conditions of Nos. 2 to 9, 11 to 18, 20 to 27, and 29 to 36 where the ΔAB is positive (exceeding 0.000%), compared to Nos. 37 to 40 where the ΔAB is negative. Especially, good effects can be confirmed under the condition where the ΔAB is 0.040% or more and 0.200% or less. Better effects can be confirmed under the condition where the ΔAB is 0.050% or more and 0.150% or less.

The invention claimed is:

1. A grain-oriented electrical steel sheet having a thermal strain-imparted region extending linearly in a direction crossing a rolling direction, wherein in a strain distribution in a rolling direction of the thermal strain-imparted region, strain at both ends of the thermal strain-imparted region is tensile strain larger than strain at a center of the thermal strain-imparted region, and in the strain distribution in a rolling direction of the thermal strain-imparted region, a difference between an average of strain amounts at both ends of the thermal strain-imparted region, which is indicated as A, and a strain amount at a center of the thermal strain-imparted region, which is indicated as B, is 0.040% or more and 0.200% or less, where the difference is indicated as ΔAB and is obtained by ΔAB=A−B.

2. The grain-oriented electrical steel sheet according to claim 1, wherein the ΔAB is 0.050% or more and 0.150% or less.

* * * * *